(12) United States Patent
Hansford

(10) Patent No.: US 6,522,100 B2
(45) Date of Patent: Feb. 18, 2003

(54) BATTERY MANAGEMENT SYSTEM

(75) Inventor: Jan Hansford, Poing (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/977,851

(22) Filed: Oct. 15, 2001

(65) Prior Publication Data
US 2002/0043955 A1 Apr. 18, 2002

(30) Foreign Application Priority Data
Oct. 16, 2000 (EP) .......................................... 00 122 562

(51) Int. Cl.$^7$ ................................................ H02J 7/00
(52) U.S. Cl. ...................................... 320/106; 320/137
(58) Field of Search ............................... 320/106, 137, 320/110, 112; 429/61; 368/55

(56) References Cited

U.S. PATENT DOCUMENTS

| | | | |
|---|---|---|---|
| 5,408,421 A | 4/1995 | Prest et al. | 702/187 |
| 5,539,298 A | 7/1996 | Perkins et al. | 320/139 |
| 5,608,306 A | 3/1997 | Rybeck et al. | 320/106 |
| 6,304,517 B1 * | 10/2001 | Ledfelt et al. | 368/10 |

* cited by examiner

Primary Examiner—Edward H. Tso
Assistant Examiner—Lawrence Luk
(74) Attorney, Agent, or Firm—Frommer Lawrence & Haug LLP; William S. Frommer

(57) ABSTRACT

The present invention relates to a mobile terminal (1) for a wireless telecommunication system, with a main body (2) and a battery pack (3) to be connected to said main body (2). The main body (2) comprises a first frequency generating means (4) for generating a first frequency information and a processing means (5) for processing said first frequency information to provide a real time information. The battery pack (3) comprises a second frequency generating means (12) for generating a second frequency information and control means (11) for controlling the transmission of said second frequency information to said processing means (5). The processing means (5) uses the second frequency information for providing updated real time information, whereby the control means (11) comprises a battery pack memory (13) for storing first information relating to an update value of the second frequency information. The first information can thereby be a calibration value for calibrating the second frequency information or an indication value indicating that a calibration value for the second frequency information is stored in the main body (2).

13 Claims, 3 Drawing Sheets

BATTERY MANAGEMENT SYSTEM

Figure 1:
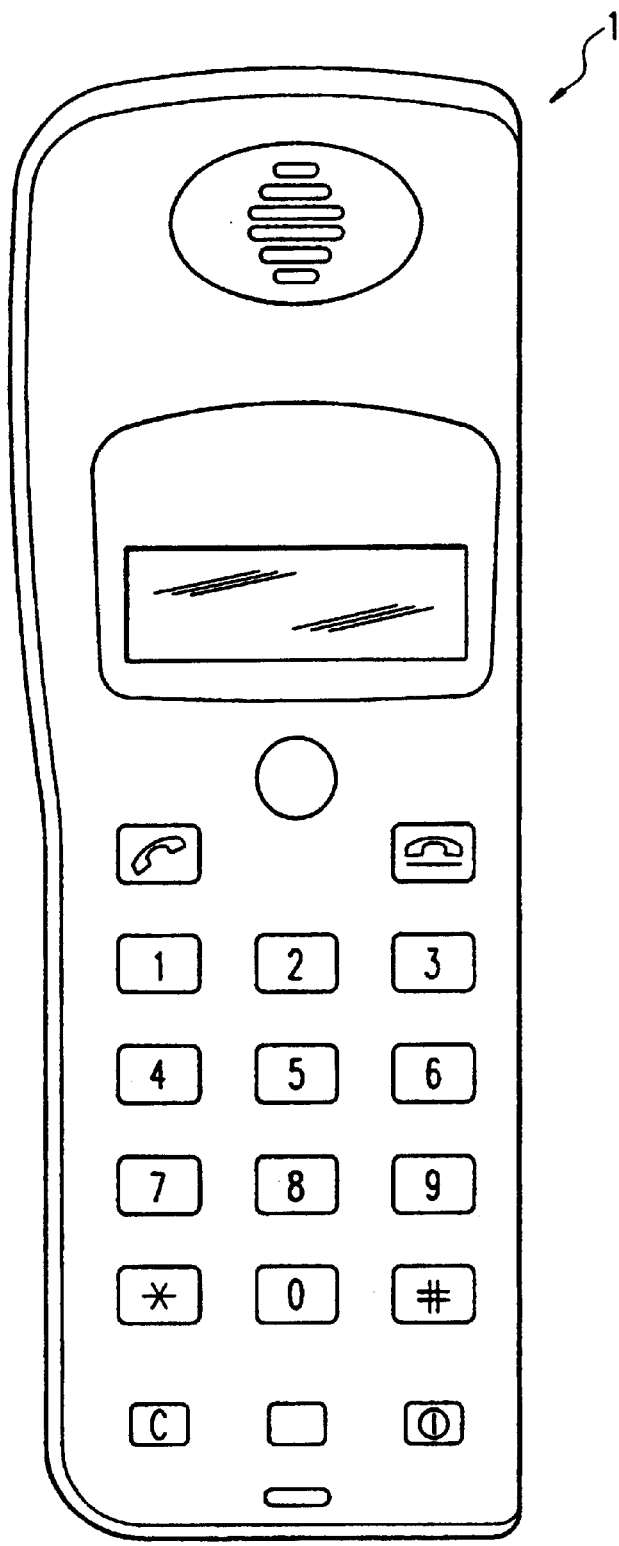

The present invention relates to a mobile terminal for a wireless telecommunication system, comprising a main body and a battery pack to be connected to the main body.

Mobile terminals for wireless telecommunication systems, such as portable telephones, laptops, notebooks, personal digital assistants and the like devices adapted for a wireless communication over an air interface as e.g. on the basis of the GSM and the UMTS system, usually comprise rechargeable battery packs for powering the mobile terminal. Such a battery pack is removably connected to a main body of the mobile terminal. The battery pack hereby comprises one or more rechargeable battery cells for powering the mobile terminal. In order to be able to stay synchronised to the respective telecommunication system as well as for internal and external control and other functions of the mobile terminal, a real time clock is provided in the main body. Hereby, when choosing and implementing a real time clock, contradictive requirements have to be met. On one hand, the real time clock should be highly accurate and as independent as possible from performance decreasing influences such as temperature drift, aging and the like, such that a correction and calibration of the real time clock means is not (permanently) necessary. This kind of highly accurate real time clock means, however, is usually a quite expensive device and has a quite high power consumption. On the other hand, a real time clock implemented in a mobile terminal should be as lightweight as possible and should not require large power for operation. This second kind of real time clocks, however, tend to be accurate enough.

In present mobile terminals for wireless telecommunication systems, real time clocks working on the basis of a 32 kHz crystal have proven to be a good tradeoff. These real time clocks are quite light and have a low power consumption, but still provide quite accurate time information. This is the reason why in many mobile terminals comprising a main body and a battery pack connected to the main body, the real time clock in the main body is working on the basis of a 32 kHz crystal or quartz device being not too expensive and consuming relatively little energy compared to highly accurate time base systems. Further, these real time clocks are quite small so that the space limitations of modern mobile terminals can be met. It has to be noted that in a real time clock, the frequency signal, as e.g. the 32 kHz frequency signal generated by a crystal or quartz device as frequency generating means is output as counts or clock cycles which are counted and then, by a corresponding processing means, processed into a real time information. In the main body of the mobile terminal, the processing means is e.g. a baseband chip receiving a frequency signal or frequency information on the basis of a frequency of 32 kHz (to be precise 32,768 kHz) from the quartz device. The baseband chip in the main body of the mobile terminal is e.g. adapted to control RF circuitry, display, audio circuitry, power management functionality and so on. The low frequency real time clock means operating on the basis of the 32 kHz frequency, however, is not sufficiently accurate for an exact synchronisation of the mobile terminal to the respective wireless telecommunication system, so that a highly accurate time base system, e.g. on the basis of a 65 MHz clock, is provided in the main body of the mobile terminal to enable an accurate synchronisation to the telecommunication system. However, this highly accurate time base is not operated constantly, but only during the mobile terminal is operating and communicating in the telecommunication system when the time frame timing of the system has to be accurately met. If the mobile terminal is not communicating in the wireless telecommunication system, the highly accurate time base goes to sleep and the low frequency real time clock is used for the operation of the mobile terminal.

Present mobile terminals further comprise a small back-up battery implemented in the main body for powering the low frequency real time clock during the battery pack is disconnected or has gone flat. The back-up battery powers the low frequency real time clock for a short period of time, e.g. several minutes, while the battery pack is disconnected and e.g. exchanged. In case that the battery pack is removed from the main body for a longer period of time, however, the real time information in the main body is lost since the back-up battery is not able to provide sufficient power for long time periods. For this reason, a further low frequency real time clock is provided in the battery pack of most present mobile terminals. The real time clock in the battery pack keeps operating while the battery pack is disconnected from the main body so that, when the battery pack is reconnected to the main body, the real time information from the battery pack is used to readjust the real time clock in the main body. The problem, however, is that no information is available about how accurate the real time clock in the battery pack is so that the processing means in the main body of the mobile terminal receiving real time clock information from a just connected battery pack cannot be sure if the received time information is reliable or not.

U.S. Pat. No. 5,608,306 e.g. discloses a system with a rechargeable battery pack including a real time clock and an application, whereby the battery pack is adapted to communicate real time data to said application. The real time data is generated on the basis of a counter value counting the oscillations of a crystal element provided in said battery pack. An additional pin is provided, which enables the transmission of the time data from the battery pack to the application. However, the proposed system suffers from the above-mentioned disadvantages.

The object of the present invention is therefore to provide a mobile terminal for a wireless telecommunication system, with a main body and a battery pack to be connected to the main body, said main body comprising a first frequency generating means for generating a first frequency information and a processing means for processing said first frequency information to provide a real time information, said battery pack comprising a second frequency generating means for generating a second frequency information and control means for controlling the transmission of said second frequency information to said processing means of the main body, whereby the processing means uses the second frequency information for providing updated real time information in the main body, which overcomes the above-mentioned disadvantages of the prior art and enables a reliable and accurate use of the second frequency information provided by a battery pack in the main body of the mobile terminal.

The above object is achieved by a mobile terminal for a wireless telecommunication system according to claim 1, comprising a main body and a battery pack to be connected to the main body, the main body comprising a first frequency generating means for generating a first frequency information and a processing means for processing the first frequency information to provide a real time information, said battery pack comprising a second frequency generating means for generating a second frequency information and control means for controlling the transmission of the second frequency information to the processing means, said processing means using said second frequency information for providing updated real time information, whereby the control means comprises a battery pack memory for storing first information relating to an update value of the second frequency information.

The use of a battery pack memory in which information relating to an update value of the second frequency information enables the processing means of the main body to determine, if the second frequency information provided by the battery pack is reliable and accurate. The update value can e.g. be a calibration value for the second frequency information or an information, that a calibration value is stored either in the battery pack or the main body. Thus, the mobile terminal according to the present invention is able to operate on the basis of a reliable and accurate time base at any time and under any circumstances. Further, the back up battery necessary in known mobile terminals can be omitted so that the main body becomes cheaper to produce and particularly the expensive disposal costs for disposing back up batteries under the corresponding European regulations are eliminated.

It is to be noted that the first frequency information generated by the first frequency generating means in the main body and the second frequency information generated by the second frequency generating means in the battery pack are oscillations of a crystal or quartz element comprised in the frequency generating means which are counted so that a count or clockcycle number is obtained. This number is accumulating with time and processed into a real time information in a known manner. Advantageously, the processing means comprises a main body memory for storing battery identity information, whereby each time a battery pack is connected to the main body, the processing means reads a battery pack identity information stored in the battery pack memory and checks if said read battery pack identity information is already stored in the main body memory. Hereby, the first information stored in the battery pack memory can be a calibration value for the second frequency information, whereby the calibration value is transmitted by the control means to said processing means and used by the processing means for providing updated real time information. Hereby, two advantageous possibilities are present. First, the calibration value can be stored in the battery pack memory when the battery pack is connected to the main body for the first time. In this case, the processing means in the main body performs a calibration of the second frequency information, e.g. on the basis of the highly accurate time base of the main body or through highly accurate time information input to the mobile terminal. Second, the calibration value can be prestored in the battery pack memory hereby the manufacturer of the battery pack memory can e.g. callibrate the second frequency information and store a corresponding calibration value in the battery pack memory. Storing of a calibration value in the battery pack memory has the advantage that in case that the battery pack is used with different mobile terminals, the calibration value stored in the battery pack memory can be supplied to the main body of the mobile terminal to be used for accurate and reliable real time information.

In an advantageous alternative, a or said main body memory of the processing means is adapted to store an update value of the second frequency information and said first information stored in said battery pack memory indicates if an update value of the second frequency information is stored in the main body memory. In this case, the information stored in the battery pack memory is a mere indication information relating to update information stored in the main body memory. Advantageously, if said battery pack is connected to the main body for a first time, the processing means performs a calibration of the second frequency information and stores a calibration value as said update value in the main body memory. Further advantageously, each time the battery pack is connected to the main body, the processing means checks if an update value is stored in the battery pack memory. Hereby, in case that the processing means detects that an update value is stored in the battery pack memory, it provides updated real time information on the basis of the update value stored in the main body memory. According to a further advantageous aspect, the battery pack memory can be adapted to store a second information indicating if a battery identification information and a second frequency information had been stored in the main body memory. Hereby, in case that the battery pack is disconnected from the main body, a last second frequency information is stored in the main body memory together with the battery pack identification information. This is advantageous when using different battery packs with one main body.

Further advantageously, the battery pack memory is adapted to store a third information indicating if the temperature level had been exceeded. Reading out this third information, a service station knows that the battery pack had been subjected to high temperatures, which could damage the capacity of the battery cells, so that corresponding countermeasures could be taken. Further advantageously, the battery pack memory is adapted to store a fourth information indicating if a wrong charging device had been connected to the main body to charge the battery pack. A wrong charging device could either be a defect charging device of the same manufacturer of the main body and the battery pack, or a charging device of a different manufacturer not corresponding to the charge requirements of the main body and the battery pack manufacturer.

Figure 2:
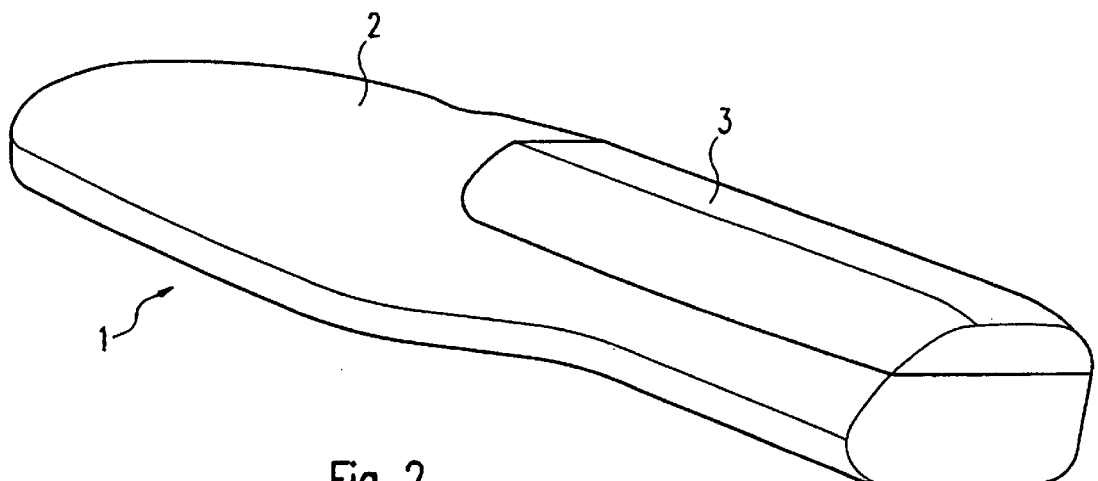
Figure 3:
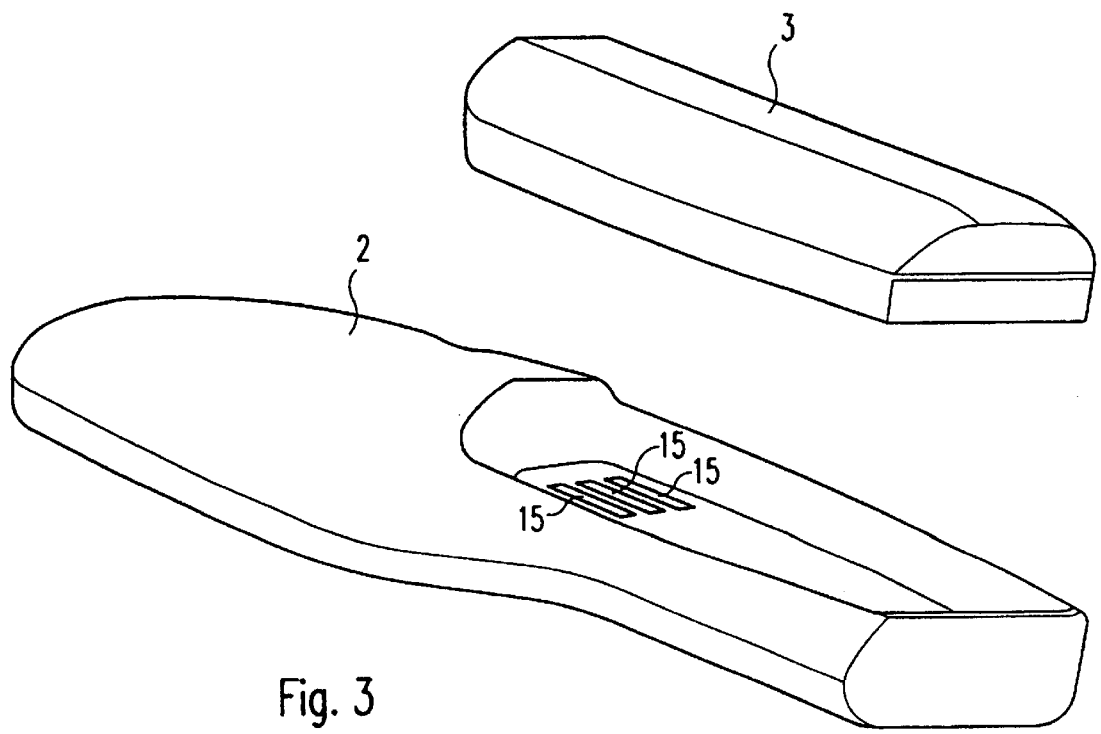
Figure 4:
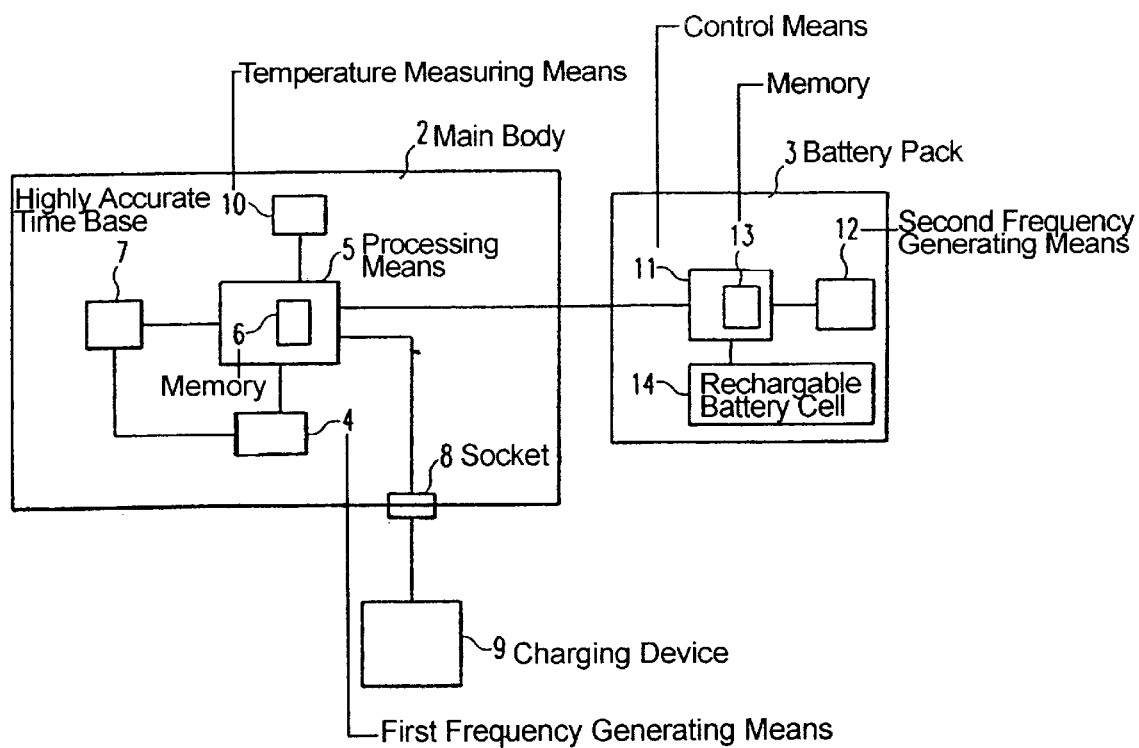

The present invention is explained in more detail in the following description in relation to the enclosed drawings, in which FIG. 1 shows a schematic top view of a mobile terminal according to the present invention, FIG. 2 shows a perspective back view of the mobile terminal shown in FIG. 1, FIG. 3 shows a perspective back view of the mobile terminal of FIG. 1 with the battery pack removed from the main body, and FIG. 4 shows schematic block diagrams of the main body and the battery pack of a mobile terminal according to the present invention.

FIG. 1 shows a schematic top view of a mobile terminal 1 for a wireless telecommunication system according to the present invention. The mobile terminal 1 is adapted to communicate with base stations of one or more of the common telecommunication systems, such as the GSM, the UMTS, the DECT or any other telecommunication system. The mobile terminal 1 comprises the necessary elements for operation, such as a keypad for inputting numbers, letters, functions, commands and the like, a display for displaying information, a loudspeaker for outputting received acoustic signals and a microphone for converting input acoustic signals into electrical signals to be transmitted. Further, the mobile terminal 1 comprises elements necessary for the operation in the wireless telecommunication system, such as a central processing unit, decoders, encoders demodulators, modulators and the like.

FIG. 2 shows a schematic perspective back view of the mobile terminal shown in FIG. 1 comprising a main body 2 and a battery pack 3. The battery pack is removably connected to the main body 2, e.g. with a mechanical snap-in connection. The battery pack 3 comprises one or more battery cells for storing power and providing power to the main body 2, i.e. the corresponding elements within the main body 2 requiring a power supply. The battery cells of the battery pack 3 are rechargeable, whereby the main body 2 comprises a corresponding socket for connection with an external power source.

FIG. 3 shows a schematic perspective back view of the mobile terminal shown in FIG. 1, whereby the battery pack 3 is removed from the main body 2. The main body 2 comprises contact elements or contact pins 15 to be connected with corresponding contact elements or contact pins of the battery pack 3. The contact elements or contact pins 15 are e.g. metallic contacts providing a physical connection between functional elements and battery cells of the battery pack 3 and functional elements of the main body 2. For example, the contact elements or contact pins 15 comprise two power line connections and one data line connection for the exchange of data between the battery pack 3 and the main body 2.

FIG. 4 shows a schematic block diagram of the main body 2 and the battery pack 3 of the mobile terminal 1 shown in FIGS. 1, 2 and 3. The main body 2 comprises a processing means 5, as e.g. a microprocessor, a microchip or the like, for controlling or processing important functions of the mobile terminal 1. For example, the processing means 5 can be a baseband chip for performing baseband controlling and processing. In respect to the present invention, the processing means 5 processes first frequency information received from a first frequency generating means 4 connected to the processing means 5 and contained in the main body 2. The first frequency generating means 4 is e.g. comprising a 32 kHz crystal or quartz device which provides an oscillating signal on the basis of the frequency of 32 kHz. Such a frequency generating means consumes little energy and needs a little space. The first frequency information generated from the first frequency generating means 4 is e.g. a count number or a clockcycle number which is accumulating according to the frequency. The processing means 5 receiving the first frequency information transforms this frequency information into a real time information in a known manner. For example, an accurate time and date input by a user via the keypad of the mobile terminal 1 or received from a base station of the wireless telecommunication system can be used to calculate a real time on the basis of the first frequency information in the processing means 5.

The main body 2 further comprises a highly accurate time base 7, which provides a highly accurate frequency information, e.g. on the basis of a 65 MHz clock. This highly accurate time base 7 is, due to its high power consumption, only operating when the mobile terminal 1 is actually communicating in the wireless telecommunication system, i.e. when a highly accurate time base for a synchronisation with the time frames of the wireless telecommunication system is required. During the standby of the mobile terminal 1, i.e. when the mobile terminal 1 is switched on but not in a communication mode, the first frequency generating means 4 is operated for generating and providing the first frequency information to the processing means 5. The processing means 5 comprises a main body memory 6, which is a non-volatile memory for storing important information. The main body 2 further comprises all necessary elements for operating the mobile terminal in the wireless telecommunication system. Further, additional measuring or detecting means can be connected to the processing means 5 for detecting and storing events which have to be monitored, as e.g. a temperature measuring means 10 for measuring the temperature of and in the main body 2 of the mobile terminal 1. Further, the processing means 5 is connected to a socket 8 for connecting an external power source or charging device 9 to the mobile terminal 1 for external power supply of the mobile terminal 1 and for charging a removable battery pack 3 comprising one or more rechargeable battery cells 14.

The battery pack 3 comprises a control means 11, such as a microchip or a microprocessor, for controlling the functions of the battery pack 3, as e.g. a transmission of power from the one or more battery cells 14 to the main body 2 of the mobile terminal 1 the transmission or reception of data to and from the processing means 5 of the main body 2. Thereby, the control means 11 of the battery pack 3 and the processing means 5 of the main body 2 are connected through at least one data line and at least one power line.

The control means 11 of the battery pack 3 comprises a battery pack memory 13, which is a non-volatile memory for storing important information in the battery pack. Further, the battery pack 3 comprises a second frequency generating means 12 for generating a second frequency information and supplying the second frequency information to the control means 11. The control means 11 transmits the second frequency information received from the second frequency generating means 12 to the processing means 5 if the connected to the main body 2. It is to be noted that the above statements in relation to the first frequency generating means 4 of the main body 2 also apply to the second frequency generating means 12 of the battery pack 3. The second frequency generating means 12 is e.g. a 32 kHz frequency generating means comprising a quartz device or a crystal, whereby the oscillations are supplied as a count number or clockcycle number from the second frequency information to the control means 11.

The battery pack memory 13 of the control means 11 of the battery pack 3 is e.g. a general purpose register for storing important data related to the second frequency information from the second frequency generating means 12. The main body 2 does not have a backup battery for backing up the first frequency generating means 4 so that the battery pack memory 13 has to store all necessary information in relation of the second frequency generating means 12 in case that the battery pack 3 is disconnected and then reconnected to the main body 2. Since both the first frequency generating means 4 of the main body 2 and the second frequency generating means 12 of the battery pack 3 are low cost, low frequency and not highly accurate devices, the processing means 5, after a battery pack 3 is disconnected and later reconnected to the main body 2, or in case that a battery pack 3 is connected for the first time, an update value or a calibration value for the second frequency information from the battery pack 3 in order to be able to provide an accurate and reliable real time information in the main body 2.

Here, two possibilities exist. In a first embodiment, an update or a calibration value for the second frequency information is stored in the battery pack memory 13 of the control means 11 of the battery pack 3. For example, a manufacturer of the battery pack 3 would, after assembling the battery pack 3, measure the second frequency information output from the second frequency generating means 12 and compare it over a predetermined time period with an exact accurate real time. The time difference or any other representative value being useful as a correction value can then be stored in the battery pack memory 13. Each time the battery pack 3 is then connected to a main body 2, the processing means 5 of the main body 2 is able to calculate an accurate real time value on the basis of the second frequency information from the second frequency generating means 12 and the calibration or update value stored in the battery pack memory 13. Hereby, if a battery pack 3 is connected to the main body 2 for a first time, the processing means 5 could read the update or calibration value from the battery pack memory 13 and store it in the main body memory 6 together with a battery identity information uniquely identifying the battery pack 3. Then, if the battery pack 3 is disconnected and reconnected to the main body 2 at a later timepoint, the processing means 5 could check by means of the battery identity information if the battery pack 3 had been connected before and, if yes, use the update or calibration value stored for that battery pack 3 in the main body memory 6 to generate an accurate real time value. The battery identity information could be stored in the battery pack memory 13 as well.

If the calibration or update value is not prestored by the manufacturer in the battery pack memory 13, another possibility is to store a calibration or update value in the battery pack memory 13 when the battery pack 3 is connected to the main body 2 for the first time. Here, a calibration or update value can be calculated by the processing means 5, e.g. by comparing the second frequency information from the second frequency generating means 12 to a highly accurate time input by a user or received from the wireless telecommunication system. Then, after the calibration or update value is obtained, it is stored in the battery pack memory 13. Also in this case, the update or calibration value can be stored in the main body memory 6 of the processing means 5 upon connecting the battery pack 3 for a first time together with a battery identity information.

According to a second alternative embodiment of the present invention, the information stored in the battery pack memory 13 of the control means 11 is not an update or calibration value as in the first embodiment, but is an indication information indicating if an update or calibration value for the second frequency information is stored in the main body memory 6 of the processing means 5. For example, the battery pack memory 13 can in this case be a four bit register, whereby the indication information is set as the most significant bit. When the battery pack 3 is connected to the main body 2, the processing means 5 of the main body 2 reads this bit to find out if the second frequency information from the second frequency generating means 12 of the battery pack 3 has been calibrated before. In case that the bit is not set, i.e. the indication information indicates that the second frequency information had not been calibrated, the processing means 5 performs a calibration. Hereby, when the battery pack 3 is connected to the main body 2, the second frequency information from the second frequency generating means 12 is forwarded to the processing means 5 and stored in the main body memory 6. At the same time, an accurate time or count number is stored in the main body memory 6. This accurate time or count number can e.g. be input from a user to the mobile terminal 1, can be received via the wireless telecommunication system or can be provided by the highly accurate time base 7 of the main body 2. Then, after a predetermined time period has elapsed, the second frequency information output from the second frequency generating means 12 is read out from the battery pack 3 and compared with the corresponding accurate time or count number. Then, the difference is stored as calibration information in the main body memory 6 and the indication information is stored in the battery pack memory 13. The predetermined time period for the calibration should advantageously be more than 12 hours. The smallest time increment of the count number or clockcycle number of the second frequency information from the second frequency generating means 12 is 1 second. The highly accurate time base used for the calibration of the second frequency generating means has in the worst case an error of slightly less than 1 second in a period of 12 hours. Since an error of less than 1 second is not detectable, the calibration period has to be more than 12 hours. An error of less than 1 second per 12 hours corresponds to an error of about 60 seconds per 30 days. Thus, if a calibration period of more than 12 hours is reached, the resolution and accuracy of the real time generated in the processing means 5 will become better than 1 minute per month.

Additionally to storing the indication information indicating if an update or calibration value of the second frequency information is available, further information can be stored in the battery pack memory 13. For example, information could be stored in the battery pack memory 13, which indicates if a battery identification information and a second frequency information have been stored in the main body memory 6. In case of using a plurality of different battery packs with one main body 2, the processing means 5 needs to know the last second frequency information from the respective battery pack and the battery identity when a battery pack is connected to the main body 2. This kind of information can e.g. also be set as a second bit in a four bit register used as the battery pack memory 13. In a third bit of the four bit register used as the battery pack memory 13, information could be stored which indicates if a preset temperature level had been exceeded in the mobile terminal 1. For example, if the temperature measuring means 10 in the main body 2 measures a temperature over the preset level, as e.g. 80° C., it supplies a corresponding information to the processing means 5, which stores this information in the battery pack memory 13. This information can be read out at a service station or at the factory, when the battery pack 3 is returned for maintenance. Further, information can be stored in the battery pack register 13, which indicates if a wrong charging device 9 had been connected to the main body 2. A wrong charging device can e.g. be a defect charging device using too high charging currents or voltages or could be a charging device from a manufacturer different from the mobile terminal facturer having not matching charging characteristics.

Further important information could be stored in the battery pack memory 13. The information stored in the battery pack memory 13 could either be used from the control means 11 of the battery pack 3, the processing means 5 of the main body 2 or by an external service station or the like to monitor or detect interesting functions or misfunctions. For example, the memory pack 13 could adapted to store information in respect to the following points: low temperature dropout voltage, real time clock calibration data (actual frequency), power off correctly, dropout voltage, fuel gauge (capacity), last recorded time and date (when phone last requested data), temperature cycle (for both battery and charging temperature), power down time and date, short circuit count, power level history, hours of usage, calls made, battery pack impedance, charge count, correct charger identification (it might be possible to read accessories and compare to see if product is a valid one), time and date first used by a user, actual capacity, accurate icon information, peak current (specifically for TDMA5 this will be a vital information accessing charge circuitries components voltage, big cost down, few selection, etc), over discharge conditions, overcharge conditions etc. Thus, the battery pack memory 13 can be used in many different advantageous ways.

What is claimed is:

1. Mobile terminal for a wireless telecommunication system, with a main body and a battery pack to be connected to said main body, said main body comprising a first frequency generating means for generating a first frequency information and a processing means for processing said first frequency information to provide a real time information, said battery pack comprising a second frequency generating means for generating a second frequency information and control means for controlling the transmission of said second frequency information to said processing means, said processing means using said second frequency information for providing updated real time information, whereby said control means comprises a battery pack memory for storing first information relating to an updated value of said second frequency information, whereby said first information stored in said battery pack memory is a calibration value for said second frequency information, and whereby said calibration value is stored in said battery pack memory when said battery pack is connected to said main body for the first time.

2. Mobile terminal according to claim 1, characterized in, that said processing means comprises a main body memory for storing battery identity information, whereby each time a battery pack is connected to said main body, said processing means reads a battery pack identity information stored in said battery pack memory and checks if said battery pack identity information is already stored in said main body memory.

3. Mobile terminal according to claim 1, whereby said calibration value is transmitted by said control means to said processing means and used by said processing means for providing updated real time information.

4. Mobile terminal according to claim 3, characterized in, that said calibration value is prestored in said battery pack memory.

5. Mobile terminal for a wireless telecommunications system, with a main body and a battery pack to be connected to said main body, said main body comprising a first frequency generating means for generating a first frequency information and a processing means for processing said first frequency information to provide a real time information, said battery pack comprising a second frequency generating means for generating a second frequency information and control means for controlling the transmission of said second frequency information to said processing means, said processing means using said second frequency information for providing updated real time information, whereby said control means comprises a battery pack memory for storing first information relating to an updated value of said second frequency information, whereby said first information stored in said battery pack memory is a calibration value for said second frequency information, whereby said calibration value is transmitted by said control means to said processing means and used by said processing means for providing updated real time information, and whereby said calibration value is stored in said battery pack memory when said battery pack is connected to said main body for the first time.

6. Mobile terminal for a wireless telecommunications system, with a main body and a battery pack to be connected to said main body, said main body comprising a first frequency generating means for generating a first frequency information and a processing means for processing said first frequency information to provide a real time information, said battery pack comprising a second frequency generating means for generating a second frequency information and control means for controlling the transmission of said second frequency information to said processing means, said processing means using said second frequency information for providing updated real time information, whereby said control means comprises a battery pack memory for storing first information relating to an updated value of said second frequency information, whereby said first information stored in said battery pack memory is a calibration value for said second frequency information, whereby said calibration value is transmitted by said control means to said processing means and used by said processing means for providing updated real time information, and whereby a or said main body memory of said processing means is adapted to store an update value of said second frequency information and said first information stored in said battery pack memory indicates if an update value of said second frequency information is stored in said main body memory.

7. Mobile terminal according to claim 6, characterized in, that if said battery pack is connected to said main body for a first time, the processing means performs a calibration of the second frequency information and stores a calibration value as said update value in said main body memory.

8. Mobile terminal according to claim 6, characterized in, that each time said battery pack is connected to said main body, said processing means checks if an update value is stored in said battery pack memory.

9. Mobile terminal according to claim 8, characterized in, that in case said processing means detects that an update value is stored in said battery pack memory, it provides updated real time information on the basis of the updated value stored in said main body memory.

10. Mobile terminal according to claim 6, characterized in, that said battery pack memory is adapted to store a second information indicating if a battery identification information and a second frequency information had been stored in said main body memory.

11. Mobile terminal according to claim 10, characterized in, that in case said battery pack memory is disconnected from said main body, a last second frequency information is stored in said main body memory together with said battery pack identification information.

12. Mobile terminal according to claim 6, characterized in, that said battery pack memory is adapted to store third information indicating if a temperature level had been exceeded.

13. Mobile terminal according to claim 6, characterized in, that said battery pack memory is adapted to store fourth information indicating if a wrong charging device had been connected to the main body to charge the battery pack.

* * * * *